(12) United States Patent
Li et al.

(10) Patent No.: US 11,675,748 B2
(45) Date of Patent: *Jun. 13, 2023

(54) EXTERNAL DATA REPOSITORY FILE INTEGRATION USING A VIRTUAL FILE SYSTEM

(71) Applicants: Atlassian Pty Ltd., Sydney (AU); Atlassian Inc., San Francisco, CA (US)

(72) Inventors: Shuai Li, Sunnyvale, CA (US); Vladimir Svidersky, Sunnyvale, CA (US)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 233 days.

This patent is subject to a terminal disclaimer.

(21) Appl. No.: 17/132,538

(22) Filed: Dec. 23, 2020

(65) Prior Publication Data

US 2021/0117391 A1  Apr. 22, 2021

Related U.S. Application Data

(63) Continuation of application No. 16/406,882, filed on May 8, 2019, now Pat. No. 10,877,944.

(51) Int. Cl.
  *G06F 16/188* (2019.01)
  *G06F 16/2458* (2019.01)
  (Continued)

(52) U.S. Cl.
  CPC .......... *G06F 16/196* (2019.01); *G06F 16/188* (2019.01); *G06F 16/2358* (2019.01);
  (Continued)

(58) Field of Classification Search
  CPC .. G06F 16/196; G06F 16/188; G06F 16/2358; G06F 16/2428; G06F 16/2458; G06F 16/248; G06F 16/25
  See application file for complete search history.

(56) References Cited

U.S. PATENT DOCUMENTS 8,117,226 B2  2/2012 Samji et al.
9,047,291 B2  6/2015 Gies et al.
(Continued)

*Primary Examiner* — William Spieler
(74) *Attorney, Agent, or Firm* — Brownstein Hyatt Farber Schreck, LLP

(57) ABSTRACT

Systems and methods for displaying a view of a virtual file system through a file viewer of a computer operating system are described herein. In an embodiment, an application receives a request to return data to display in a view of a file repository from a service of a computer operating system which is configured to cause displaying of the view of the file repository. The application accesses stored configuration information which identifies one or more particular queries which are mapped to a particular folder of the file repository. The application transmits the one or more particular queries to a database management system and receives structured data that satisfies the one or more particular queries in response. The application returns the structured data to the service of the computer operating system to cause the service to display, in the view of the file repository, the particular folder and a view of one or more files in the particular folder comprising the structured data that satisfies the one or more particular queries.

20 Claims, 6 Drawing Sheets

(51) Int. Cl.
*G06F 16/25* (2019.01)
*G06F 16/242* (2019.01)
*G06F 16/248* (2019.01)
*G06F 16/23* (2019.01)

(52) U.S. Cl.
CPC ........ *G06F 16/248* (2019.01); *G06F 16/2428* (2019.01); *G06F 16/2458* (2019.01); *G06F 16/25* (2019.01)

(56) References Cited

U.S. PATENT DOCUMENTS

| | | |
|---|---|---|
| 9,495,410 B1 | 11/2016 | Bhudavaram et al. |
| 2004/0193621 A1 | 9/2004 | Moore |
| 2004/0230599 A1 | 11/2004 | Moore |
| 2006/0080465 A1* | 4/2006 | Conzola .............. H04L 67/1008 709/245 |
| 2006/0235871 A1 | 10/2006 | Trainor et al. |
| 2007/0255677 A1 | 11/2007 | Alexander et al. |
| 2014/0006350 A1 | 1/2014 | Fukui et al. |
| 2016/0041992 A1* | 2/2016 | Miyata .................. G06F 16/285 707/740 |
| 2016/0246816 A1 | 8/2016 | Abiri et al. |
| 2019/0079949 A1 | 3/2019 | Nichols et al. |

* cited by examiner

Folder Format

402
Folder Name

404
Folder Contents
*Attribute Type*
Equals

406
File Attributes
Date Created
Last Modified
Status

NEXT

400

File Format

412
File Name
AttributeB_DateCreated

414
File Type
.txt

416
Icon Settings
Image135.jpg
*Attribute Type*
Equals

418
Formatting Tools
Set as Title
"Tickets for" AttributeC

NEXT

EXTERNAL DATA REPOSITORY FILE INTEGRATION USING A VIRTUAL FILE SYSTEM

CROSS-REFERENCE TO RELATED APPLICATION(S)

This application is a continuation patent application of U.S. patent application Ser. No. 16/406,882, filed May 8, 2019 and titled "External Data Repository File Integration Using a Virtual File System," the disclosure of which is hereby incorporated herein by reference in its entirety.

FIELD

One technical field of the present disclosure relates to virtual file systems and database management systems. Another technical field is data processing as applied to updating multiple records of databases that are managed using application programs with limited batch update capabilities.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Many file management systems provide access to data and tools for manipulating the data both through a front-end application and back-end data management. The front-end manipulation is usually customer focused and is provided through an application interface, either through downloadable software or web implementations. Back-end manipulation allows data to be viewed and edited directly through a data repository, often through a representational state transfer (REST) application program interface (API) of a database management system. As an example, an issue tracking system may allow a user to view a ticket in a front-end application while the structured data of the ticket is stored in an external data repository.

Front-end operations are often convenient for making small changes, such as individual additions or deletions to a single ticket through a web interface, but are often not suitable for some larger tasks, such as moving or augmenting a larger number of tickets in the same way. Storage through a web interface or other application interface can be slow and such programs are often not built to perform a large number of changes quickly.

A similar issue exists with back-end operations. Even small-scale operations may comprise a large number of database operations. Batch operations with respect to a large number of tickets, such as appending a comment onto each ticket, can significantly increase the number of database operations required to perform them.

A REST API may be configured to translate single operations into the many database operations, but using a REST API requires generating a new set of tools for the REST API and educating engineers and support specialists in the use of the new tools. Meanwhile, most operating systems contain known tools for manipulating files stored in memory of the client device or connected device through a file viewer application.

Unfortunately, said tools are only available for configured files stored in memory on a client computing device or connected external device, such as an external hard disk or server. The same tools cannot be used to directly affect structured data received from an external data repository, such as the rows in an external database. In order to use the same tools to view a file, a user would have to request the individual tickets from the database, configure the individual tickets into files, and store said files on the client computing device. But even then, the user would be unable to use those tools to affect the data stored in the external data repository as opposed to affecting the stored copies of the data.

Thus, there is a need for a system which can generate and display a virtual file system through a file viewer interface of a client computing device using structured data from an external data repository. There is an additional need for a system which can translate operations performed using the tools of the file viewer application into operations to be sent to a database management system.

SUMMARY OF THE INVENTION

The appended claims may serve as a summary of the invention.

BRIEF DESCRIPTION OF THE DRAWINGS

In the drawings:

FIG. 4 depicts an example configuration interface.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

In an embodiment, a database file synchronization application receives a request to display a virtual file system from a service of the computer operating system. The application reviews stored configuration information which defines queries that are mapped to individual folders of the virtual file system. The application sends a request comprising the defined queries to a database management system which returns the structured data retrieved from an external data repository that satisfies the queries. The application generates a view of the virtual file system wherein a particular folder comprises one or more files which correspond to structured data received from the database management system in response to one or more queries were mapped to the particular folder. When a change is made to a file through a service of the computer operating system, the application translates the change into one or more changes to stored structured data in the external data repository and sends a request to implement the changes to the database management system.

Figure 1:
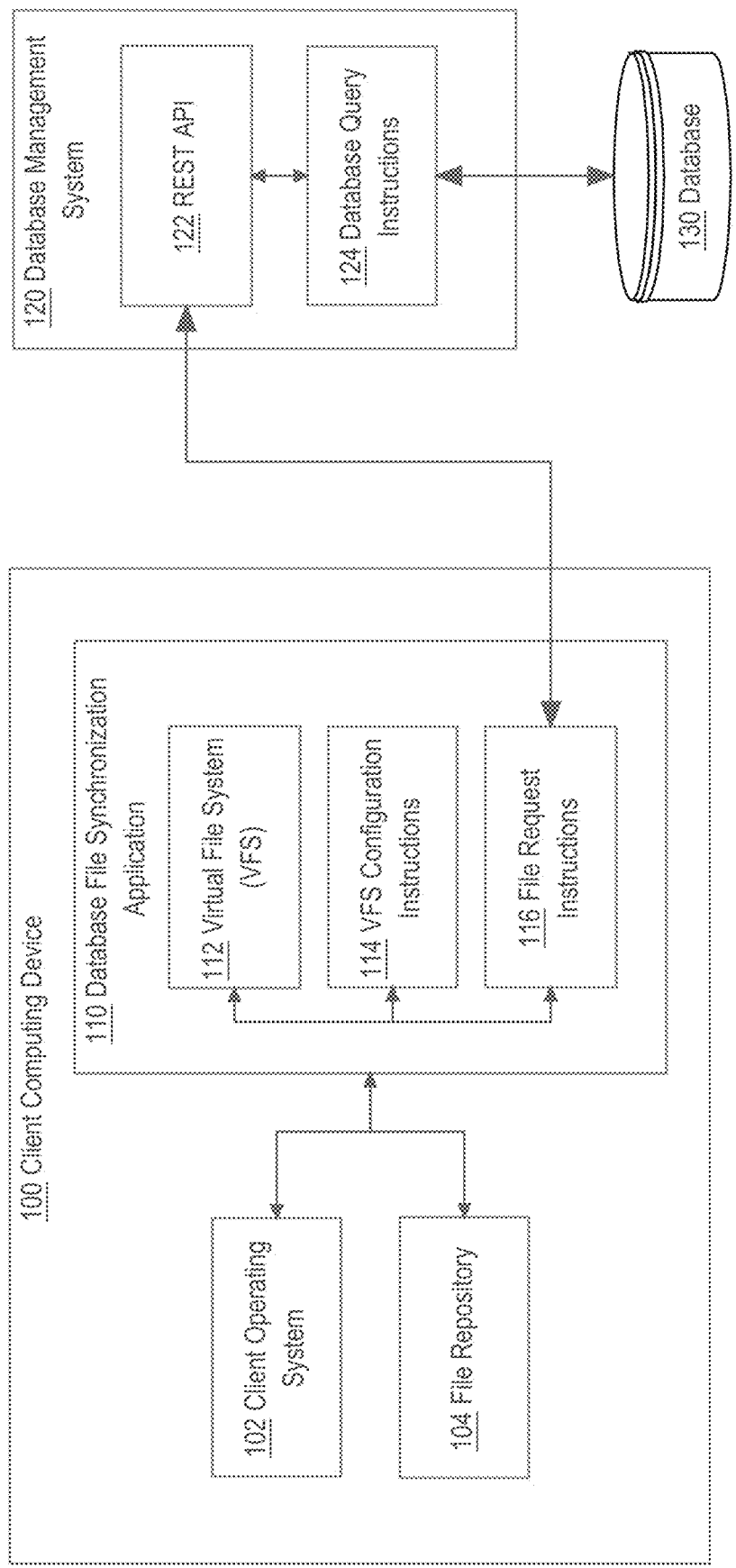
FIG. 1 depicts an example distributed computer system that is configured to perform the functions described herein.

In an embodiment, a method comprises receiving, from a service of a computer operating system which is configured to cause displaying of a view of a file repository, a request to return data to display in the view of the file repository; accessing stored configuration information which identifies one or more particular queries which are mapped to a particular folder of the file repository; transmitting the one or more particular queries to a database management system and receiving, in response to the database management system executing the one or more particular queries, structured data that satisfies the one or more particular queries; returning the structured data to the service of the computer operating system to cause the service to display, in the view of the file repository, the particular folder and a view of one or more files in the particular folder comprising the structured data that satisfies the one or more particular queries Structural Overview FIG. 1 depicts an example system that is configured to perform the functions described herein. In FIG. 1 a client computing device 100 is communicatively coupled to a database management system 120 a network. The network broadly represents any combination of one or more data communication networks including local area networks, wide area networks, internetworks or internets, using any of wireline or wireless links, including terrestrial or satellite links. The network may be implemented by any medium or mechanism that provides for the exchange of data between the various elements of FIG. 1. The various elements of FIG. 1 may also have direct (wired or wireless) communication links. The client computing device 100 and database management system 120 each comprise an interface compatible with the network and are programmed or configured to use standardized protocols for communication across the network such as TCP/IP, Bluetooth, and higher layer protocols such as HTTP, TLS, and the like.

Client computing device 100 is a computer that includes hardware capable of communicatively coupling the devices to one or more server computers, such as database management system 120 over one or more service providers. For example, client computing device 100 may include a network card that communicates with database management system 120 through a home or office wireless router (not illustrated in FIG. 1) coupled to an internet service provider. Client computing device 100 may be a personal computer, laptop, or any other computing device capable of transmitting and receiving information and performing the functions described herein.

In an embodiment, client computing device stores a client operating system 102, a file repository 104, and a database file synchronization application 110. Client operating system 102 comprises system software that manages computer hardware and software for the client computing device. Example operating systems 102 include WINDOWS provided by Microsoft Corporation, MACOS provided by Apple, and LINUX, an Open Source software operating system available on Linux.org. File repository 104 comprises a data repository for storing files in memory of the client computing device, such as a disk drive. The client operating system 102 is programmed or configured to access the file repository 104 and display a view of at least a portion of the file repository on the client computing device. The view may include names of files and/or folders, icons for the files and/or folders, and additional information relating to the files and/or folders, such as a last modified date or author information.

Database file synchronization application 110 comprises a software configured to interact with the client operating system 102 for the purpose of displaying a view of a virtual file system generated using external structured data from an external source. The database file synchronization application comprises a virtual file system (VFS) 112, VFS configuration instructions 114, and file request instructions 116. When the client operating system receives requests that affect the VFS, such as a request to view the VFS, to view files in the VFS, or to make alterations to a file in the VFS through tools provided by the client operating system, the client operating system may pass the request to the database file synchronization application 110 which then translates the request into an action to perform with respect to the data stored in the external data repository and/or updates the view of the VFS based on the request.

VFS 112 comprises a software interface for communicating with the client operating system 102 which allows for the generation of specialized file systems. An example of a virtual file system includes the Open source Filesystem in Userspace (FUSE) file system, which is available at the time of this writing in source code format on GitHub. The VFS 112 may be programmed or configured to receive requests from the client operating system 102 to display a view of files and/or folders associated with the VFS 112. The VFS 112 may be further configured to generate a view of the files and/or folders or to send instructions to the client operating system 102 for generating a view of the files and/or folders.

VFS configuration instructions 114 comprise one or more instructions for configuring the VFS. The database file synchronization application 110 may access the VFS configuration instructions to identify one or more queries to send to the database management system 120 and/or to determine how to configure one or more folders or files based on received structured data from the database management system 120. In an embodiment, the VFS configuration instructions 114 comprises a configuration file stored in memory of the client computing device 100 which is accessed by the database file synchronization application 110 in response to one or more triggering events, such as receiving a request to display a view of a virtual file system or a request to display a particular file.

Figure 2:
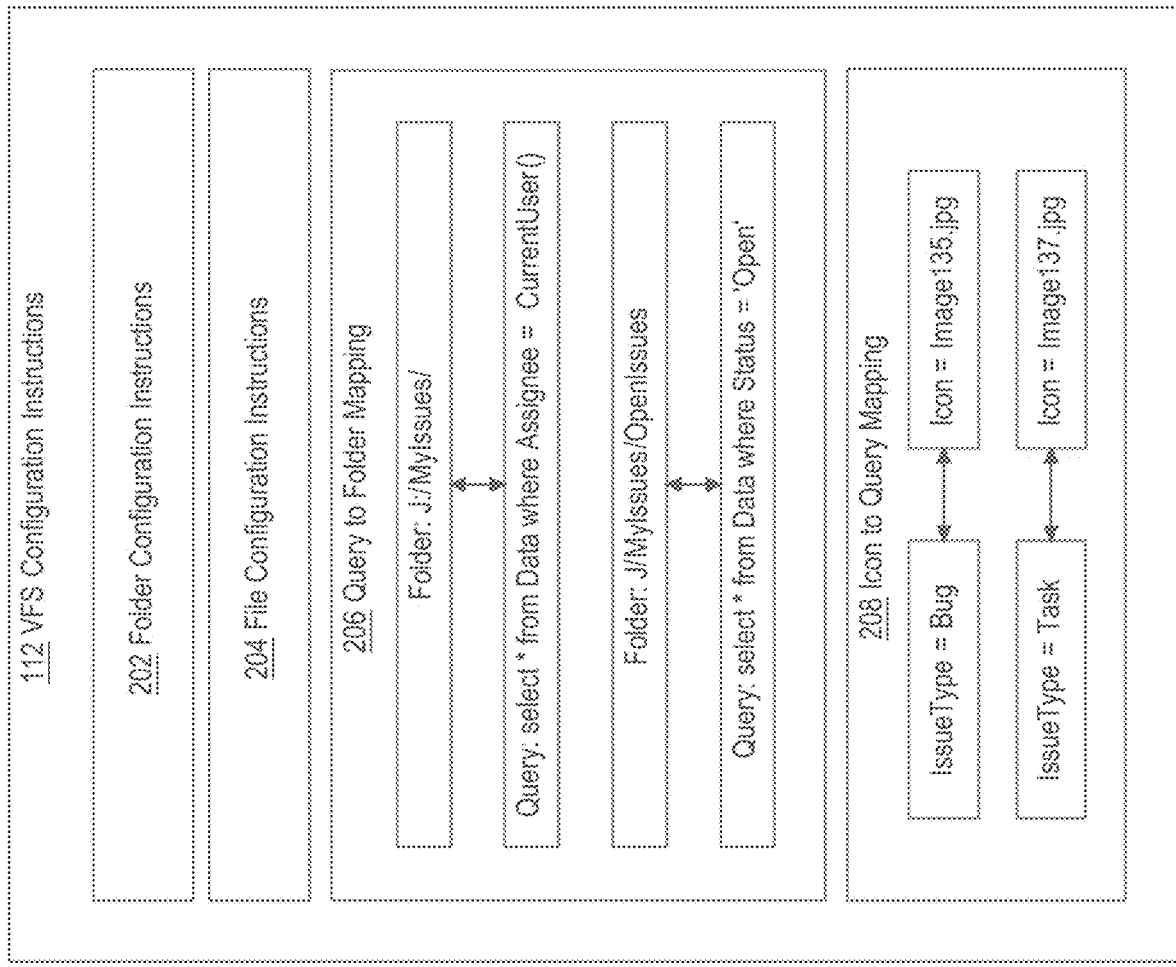
FIG. 2 depicts an example of virtual file system configuration instructions.

FIG. 2 depicts an example of VFS configuration instructions 112. The example of VFS configuration instructions in FIG. 2 is not intended to be an exhaustive list or a required list of configuration options and embodiments may comprise more or less configuration options than those displayed in FIG. 2. The configuration options in VFS configuration instructions 112 comprise a set of instructions that define how the file synchronization application is to request structured data from the database management system, format or configure the structured data for display, and or track particular attributes.

Folder configuration instructions 202 comprise computer readable instructions which define one or more aspects of the configuration of folders in the VFS. Folder configuration instructions 202 may include hierarchy data and/or tracked attribute data. Hierarchy data, as used herein, refers to data defining a hierarchical structure for one or more folders in the VFS. For example, hierarchy data for a VFS relating to a support ticket system may define a folder structure which includes a high-level folder named "known issues" and one or more folders within the "known issues" folder, each of which are named after a known issue. Tracked attributes, as used herein, comprises attributes of the structured data which is tracked for display or inclusion as metadata in the folder. For example, tracked attribute data for a VFS relating to the support system may define tracked attributes such as a title of complaint, category of complaint, date a complaint was created, date the complaint was last modified or acted on, a ticket number, or any other data or metadata attributes of the structured data stored in database 130.

File configuration instructions 204 comprise computer readable instructions which define one or more aspect of the configuration of files in the VFS. File configuration instructions 204 may include file type data, data manipulation rules, and/or file feature information. File type data, as used herein, refers to data defining file types for one or more files in a folder of the VFS. For example, file type data for a VFS may define files within one or more folders of the VFS as ".txt" files. File type data may also define file types based on one or more attributes of the file. For example, a file type data rule may define a file type associated with a first attribute as a ".txt." file and a file type associated with a second attribute as a ".png" file. The attributes may refer to a data store associated with the file, a value of a row of structured data, and/or any other information which can be obtained from the external structured data.

Data manipulation rules, as used herein, refer to data defining rules for manipulating structured data in a particular file. The rules may refer to formatting, data placement, data use, and/or data alterations. For example, a data manipulation rule for a VFS relating to the support system may include a first rule that data corresponding to a "ticket name" attribute is place in bold at the top of the file while data corresponding to a "ticket category" attribute is placed in a header. As another example, a data manipulation rule may include a calculation of a difference between a time a ticket has been open and an average open time for tickets of a particular type.

File feature information, as used herein, refers to data defining one or more features of a file. For example, file feature information for a VFS relating to the support system may specify that a name of a file corresponds to one or more attributes pulled from the structured data, such as a value of a particular column. As another example, file feature information for a VFS may specify metadata for a file, such as permission metadata specifying which parameters may be altered, if any.

Query to folder mapping 206 comprises a mapping of query definitions to folders of the VFS. The query definitions, as used herein, refer to defined requests for data matching one or more attributes. While the queries shown in FIG. 2 are featured in the Structured Query Language (SQL), the queries stored in the configuration information may be defined in any language that can be parsed by the database management system and/or the database file synchronization application 110. The query to folder mapping 206 identifies queries that correspond to particular folders, such that data which satisfies the queries are displayed in the corresponding folders as files and/or attributes of the files.

FIG. 2 depicts example queries and corresponding folder mappings. For instance, in FIG. 2, a query for all issues assigned to a current user is mapped to the folder "J:/MyIssues/" while a query for rows where a value in the status column is identified as "Open" is mapped to the folder "J:/MyIssues/OpenIssues". Thus, data which satisfies the "MyIssues" query would be displayed in the "MyIssues" folder and data which satisfies the "Open" query would be displayed in the "Open Issues" folder. Additionally or alternatively, the configuration instructions may identify the "OpenIssues" folder as comprising a subset of the data satisfying the "MyIssues" query which also satisfy the "Open" query.

In an embodiment, queries may identify overlapping data for different folders of the VFS. For example, in FIG. 2, a query for data where a value in an "Issue Type" column equals "Task" may not be mutually exclusive to the query for data where a value in the status column equals "Open". Thus, if a particular ticket for a task is currently open, data relating to the particular support ticket may be displayed in both a Task folder and the OpenIssues folder. In an embodiment, different folders may be stored with different folder and/or file configuration data. Thus, the ticket for the task that is open may be displayed differently in each folder, may have different tracked attributes in each folder, and/or may be configured according to a different set of parameters, such as different file type, data manipulation rules, or file features.

Icon to query mapping 208 comprises a mapping of query definitions to icons. The query to icon mapping 208 identifies queries that correspond to particular images, such that data which satisfies the queries are displayed in the VFS using the corresponding images as icons. For example, a first image, Image135.jpg, is mapped to all issues where the IssueType equals 'Bug' while a second image, Image137.jpg, is mapped to all issues where the IssueType equals 'Task'. The database file synchronization application may store the mapped images and/or pointers to the mapped images which are stored either remotely or in memory of the client computing device. The icon to query mapping 208 may be universal or folder specific. For example, a first icon to query mapping may be stored for a first folder while a different icon to query mapping is stored for a second folder, thereby allowing different images to be displayed for data in different folders.

Referring again to FIG. 1, file request instructions 116 comprise computer readable instructions which, when executed by the client computing device, causes the client computing device to send a request to the database management system 120 for data matching one or more queries stored in the VFS configuration instructions 114. For example, the database file synchronization application 110 may contain file request instructions 116 which identify a rest application programming interface (API) of the database management system 120 with instructions in how to make a request from the REST API for data satisfying a particular query.

Database management system 120 comprises a computing system external to the client computing device which is programmed or configured to interact with one or more databases. Database management system 120 may be implemented using a server-class computer or other computers having one or more processor cores, co-processors, or other computers. Database management system 120 may be a physical server computer and/or a virtual server instance stored in a data center, such as through cloud computing. In an embodiment, database management system 120 comprises REST API 122 and database query instructions 124.

REST API 122 comprises an application programming interface configured to receive requests for data from external sources. The REST API 122 may be further configured to authenticate the client computing device 100. Authenticating the client computing device 100 may comprise determining, based on credentials received from the client computing device, whether the client computing device is authorized to access data stored in database 130. Authenticating may also include determining a type of allowed access, such as read-write privileges. REST API 122 may also be configured to receive data indicating a subset of the database 130 that may be accessed by the client computing device 100, such as through stored permission data or data identifying portions of database 130 corresponding to different clients.

Database query instructions 124 comprise computer readable instructions which, when executed by the database management system 120, cause the database management system 120 to query database 130 for data matching one or more query attributes. The database management system 120 may execute the database query instructions 124 in response to receiving a request for data through REST API 122 from the client computing device 100.

Database 130 comprises a data repository storing structured data items. While examples are generally described with respect to support tickets, other structured items, such as documents in a virtual document repository or other tracked information in a database. The methods and systems described herein may be utilized with any data repository where individual data items, such as rows in a database or support tickets, may be identified based on one or more values, such as a column value. In an embodiment, the database and data items within are independent of the client computing device and the operating system and are stored remotely from the client computing device.

In an embodiment, each of VFS configuration instructions 114, file request instructions 116 and database query instructions 124 comprises a set of one or more pages of main memory, such as RAM, in the client computing device 100 or database management system 120 into which executable instructions have been loaded and which when executed cause the computer system to perform the functions or operations that are described herein with reference to those modules. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the instructions also may represent one or more files or projects of source code that are digitally stored in a mass storage device such as non-volatile RAM or disk storage, in the client computing device 100 or database management system 120 or a separate repository system, which when compiled or interpreted cause generating executable instructions which when executed cause the computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the client computing device 100 or database management system 120.

Generating a View of a Virtual File System

In an embodiment, the database file synchronization application causes display of a VFS through the client operating system. Causing display of the VFS may include retrieving data from an external data source and formatting the retrieved data based on one or more rules in order to display the data in a form similar to the display of data files stored in memory of the client computing device through a same interface as the interface used by the client computing device to display data stored in memory. By displaying retrieved data through a VFS in a same interface of the client computing device as is used for data stored in main memory, the database file synchronization application increases the number of tools that may be used to manipulate data from the external data repository.

A file, as used herein, refers to a computer resource for recording data discretely in a computer storage system. The systems and methods described herein use structured data to generate a view of one or more files based on structured data. The files themselves may be generated and stored in memory of the client computing device in response to a request to access the view of the one or more files and/or in response to a request to open the one or more files. Thus, the structured data corresponding to a file may be generated and displayed through the view of the one or more files prior to the generation of the file. As an example, attributes for a document, such as the document name and date may be displayed in the view of a file, but stored as structured data until a request to access the document is received.

The client computing device 100 may initially install the database file synchronization application comprising a VFS and instructions for communicating with an API of an external computing device, such as a REST API of a database management system. The database management system may initially authenticate the client computing device based on one or more identifiers sent to the database management system through the synchronization application. In an embodiment, the database management system identifies a particular dataset that may be accessed by the client computing device. For example, if the database management system manages data for a plurality of clients, the system may identify a subset of the managed data corresponding to an authenticated client based on the information sent from the client computing device.

In an embodiment, the client computing device 100 selects configuration settings for the VFS through the database file synchronization application. Methods and interfaces for selecting configuration settings for the VFS are described further herein. In an embodiment, the database file synchronization application comprises default configuration settings, such that a client computing device can use the VFS from the database file synchronization application without specifying initial configuration settings.

Figure 3:
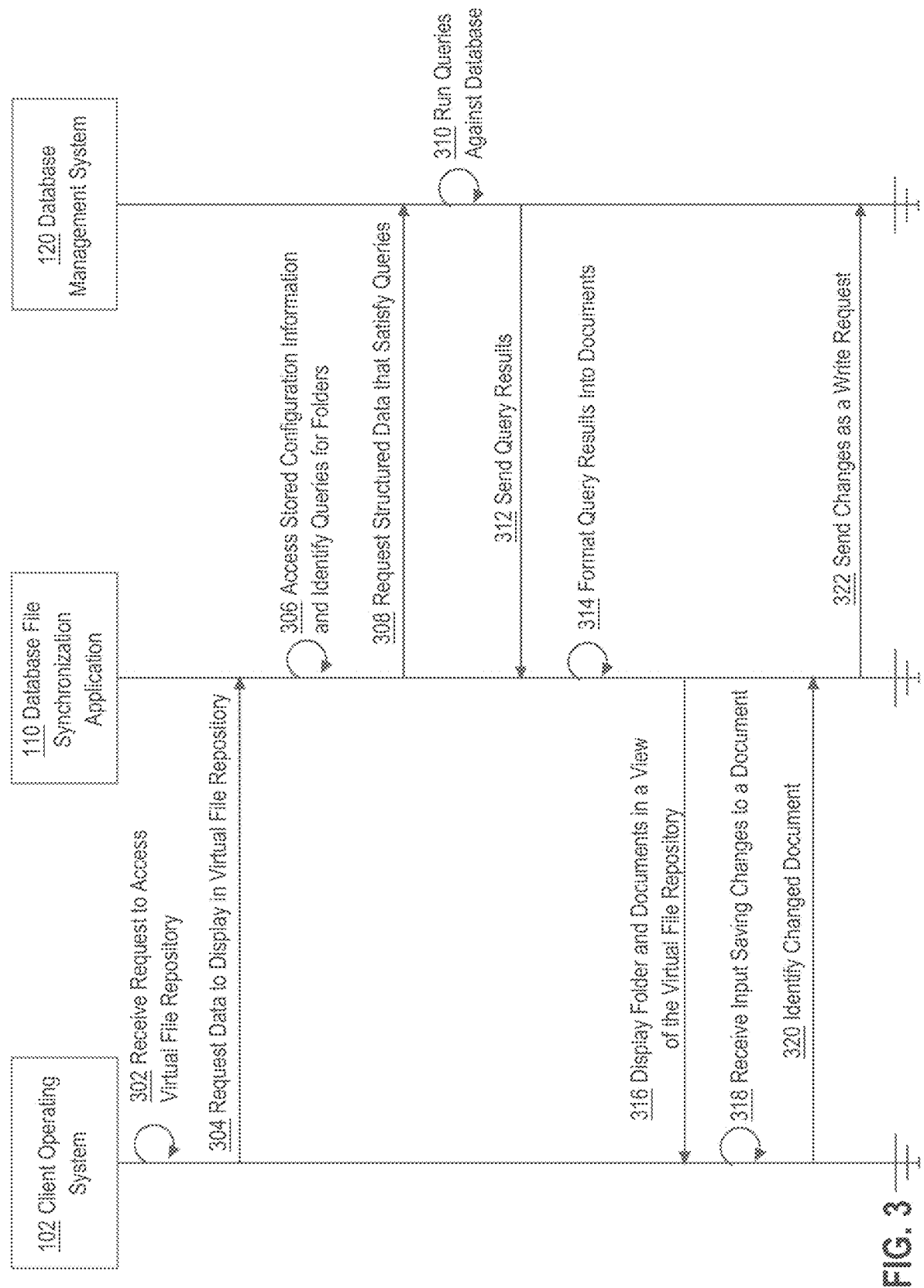
FIG. 3 depicts an example method for displaying a virtual file system through a client computing device using structured data from an external computing system.

FIG. 3 depicts an example method for displaying a virtual file system through a client computing device using structured data from an external computing system.

At step 302, a request to access a virtual file repository is received at the client operating system 102. For example, the client computing device may display a file viewer interface which identifies a plurality of file locations, such as a C drive (C:) or other memory locations. In an embodiment, the client operating system may further display, with the plurality of file locations, an option to view files from the virtual file system. For example, an option below the (C:) drive may be a J drive (J:) relating to the virtual file system. The client computing device may receive the request to access the virtual file repository through a selection by a user of the (J:) drive.

At step 304, the client operating system requests data to display in the virtual file repository from the database file synchronization application 110. For example, the client operating system may be configured to request a display of the VFS from the database file synchronization application in response to receiving a selection of a folder corresponding to the VFS, such as the (J:) drive.

At step 306, the database file synchronization application 110 accesses stored configuration information and identifies one or more queries for one or more folders. For example, the database file synchronization application 110 may store configuration information identifying one or more folders for the VFS and one or more queries that correspond to a particular folder of the one or more folders.

In an embodiment, the database file synchronization application identifies each query associated with a folder in the configuration information in response to receiving the request from the client operating system. For example, if the configuration information includes identifiers of five folders, four of which are associated with a query, the database file synchronization application may identify the four folders in response to receiving the request from the client operating system. Additionally or alternatively, the database file synchronization application may identify a query for a particular folder in response to receiving data indicating a request to view the particular folder. Thus, the database file synchronization application may be configured to request data for a folder in response to a user selecting the folder to view.

At step 308, the database file synchronization application 110 requests structured data that satisfies the identified one or more queries from the database management system 120. For example, the database file synchronization application 110 may send each identified query to the database management system through a REST API of the database management system. The database file synchronization application may additionally send, with each query, a query identifier to be associated with returned results of the query.

In an embodiment, the database file synchronization application additionally requests data regarding the results of the one or more queries. For example, if the configuration information specifies three attributes which are to be tracked for a folder, used to create metadata, used to select an image or other configuration parameter, or otherwise manipulated, the database file synchronization application may be configured to request values for the three attributes in addition to the data satisfying the query. Additionally or alternatively, the database file synchronization application may request complete data items, such as full rows of a database or all data of a specific structured data item, such as a ticket in a support system.

At step 310, the database management system 120 runs the one or more queries against a database. For example, the database management system 120 may be configured to perform a search of the database for data which satisfies the one or more queries. The database management system 120 may additionally perform a search of the database for any additional attributes relating to the results of the query. In an embodiment, the database management system 120 searches additional records for tracked attributes, such as searching a change log to determine when a particular data item was last modified.

At step 312, the database management system 120 sends one or more query results to the database file synchronization application 110. For example, the database management system may send structured data to the database management system that satisfies the one or more queries. As an example, if the database file synchronization application requests a search of the data repository for all tickets assigned to a current user, the database management system may send structured data to the database file synchronization application comprising ticket data from each ticket which includes an ID of the current user in the 'Assignment' field.

In an embodiment, the database management system 120 additionally sends data indicating which data items correspond to each query, such as the query identifier sent by the database file synchronization application, thereby allowing the database file synchronization application to send multiple queries simultaneously and be able to identify which received data items correspond to which queries.

At step 314, the database file synchronization application 110 formats the query results into files. For example, the database file synchronization application may identify, in the configuration information, instructions for generating a document using the received structured data. The configuration information may include tracked attribute data, image mappings, file type data, data manipulation rules, and/or file feature information. In an embodiment, the database file synchronization application identifies configuration information for a file based on which folder the file is to be viewed through. For example, the configuration information may specify different configuration rules for files in different folders. Thus, the database file synchronization application may configure a particular data item a first way for a first folder and a different second way for a second folder which is associated with different configuration rules than the first folder.

The database file synchronization application may use the configuration information to generate individual files corresponding to different structured data items. For example, the database file synchronization application may generate a file for each row returned from the database or each ticket of a support ticket system received. In an embodiment, the database file synchronization application performs one or more of the configuration steps after receiving a request to view a particular file. For example, the database file synchronization application may first determine how to display the individual data items in a folder, such as through display of an icon, a file name, and/or one or more tracked attributes. When the database file synchronization application receives a request to view an individual file, the database file synchronization application may generate the file based on the configuration information.

At step 316, a folder and one or more files are displayed in a view of the virtual file repository by the client operating system 102. For example, the database file synchronization application may generate a view of the VFS based on one or more configuration options in a same interface as a file viewer for files stored on memory of the client computing device. Thus, the view may include file icons, file names, and/or tracked attributes. Example file viewers are described further herein. By displaying the VFS through a file viewer interface used by the client operating system to display files stored in memory, the database file synchronization application allows the client computing device to use the tools of the file viewer to change or otherwise interact with data stored in an external database.

File Changes

In an embodiment, the database file synchronization application uses changes to files or files displayed through the VFS to update data stored in the external data repository. The database file synchronization application thus may translate actions taken with respect to a file through a file viewer interface into one or more data repository operations that can be implemented with respect to the data repository, thereby providing a middle ground interface between an application interface for an application relating to the data repository and a back end interface for performing individual data repository operations.

At step 318, the client operating system receives input saving changes to a file. For example, the client computing device may receive a request to view a particular file within the VFS. The database file synchronization application may configure the file from structured data received from the database management system in response to the request to view the particular file and/or in response to receiving the structured data from the database management system. The client computing device may then display the particular file through one or more interfaces, such as a text editor application for a text file. The client computing device may then receive input changing one or more values in the file followed by a request to save changes.

In an embodiment, the one or more changes comprise changing data in a particular location. For example, if the file configuration information defines a rule that a first line in a file corresponds to an issue name, then a change to the first line in the file may correspond to a change in the issue name. Additionally or alternatively, if one or more fields are locked for editing, such as the issue name, the text file may not accept changes in the location corresponding to the locked fields.

In an embodiment, the one or more changes comprises movement of a file from one location in the VFS to another location in the VFS. For example, two folders in the VFS may be associated with different queries, such as a folder corresponding to a query for data where the "Status" value is "Open" and a folder corresponding to a query for data where the "Status" value is "Closed." If a file is moved from the "Open" folder to the "Closed" folder, the client computing device may determine that input has been received saving changes to the "Status" value in the file from "Open" to "Closed".

Similarly, where two folders do not contain mutually exclusive queries, the movement from one folder to a new folder may be treated by the client computing device as saving an addition of query requirements of the new folder to the file. For example, a "Components" field may comprise one or more values from a list of components, such as "Server", "Client", "Infrastructure", and "Documentation". If a file is moved from a "Server" folder to an "Infrastructure" folder, the client computing device may copy the file into the "Infrastructure" folder and determine that "Infrastructure" is to be added to the "Components" field for the file. Similarly, deletion of a file from a folder may be treated as input clearing the query attributes of the folder from the file. For example, if a file is deleted from the "Server" folder, the client computing device may determine that the query attribute of the "Server" folder, i.e., the "Server" value in the "Components" field, has been removed from the file.

Other changes to a file may include changes to the file name or image icon for a file. Where the change to the file corresponds to a value dictated by a query, such as a query requirement for a folder or a configuration option indicating placement of data from a particular field into the name of a file, the client computing operating system may indicate the change to the database file synchronization application. The database file synchronization application may then determine which queries correspond to the changes in order to determine which changes to make to the file. Thus, if a change is made to the file name, the database file synchronization application may determine which rules were used to create the file name. As an example, if the file name is generated as a concatenation of a particular attribute followed by a date the file was created and a change is made to the first part of the file name, the database file synchronization application may determine that the particular attribute has been changed.

In an embodiment, a file change includes the generation of a new file. For example, if the system receives a request to generate a new file for the VFS, the system may generate a pre-configured file with placeholders for the different attributes. Thus, if the configuration information specifies that a first attribute appears in the header of a file, the system may generate a file with a header that includes a place holder for the first attribute which identifies the name of the first attribute. Data placed into that portion of the header may be identified by the system as being data to be placed into the first attribute in a new item in the external data repository corresponding to the file, such as a particular column of a new row in a database.

In an embodiment, the file change includes moving of a file from outside of the VFS into the VFS. The system may use the configuration information to break apart the file into one or more attributes for writing to the external data repository. Thus, if the configuration information specifies that the title of each file is generated from a particular attribute, then the system may determine, when the file is added to a folder of the VFS, that the title of the file should be written to the particular attribute in a new item in the external data repository corresponding to the file, such as a particular column of a new row in a database.

At step 320, the client operating system identifies the changed file to the database file synchronization application. For example, the client operating system may indicate to the database file synchronization application that a change was made to the file, such as a saved change within the file or other alteration of the file, such as movement of the file to a folder or change of an attribute of the file.

The database file synchronization application may determine an effect of the one or more changes to the file. For example, when a file is removed from a folder, added to a folder, or moved from one folder to another, the database file synchronization application may identify, in the configuration information, one or more queries that correspond to the folder. The database file synchronization application may determine that the effect of the one or more changes to the file is a change that makes the file no longer satisfy queries corresponding to the folder from which the file was removed and/or that makes the file satisfy queries corresponding to the folder into which the file was moved.

In an embodiment, the database file synchronization application identifies a plurality of changes, such as changes made to a plurality of files or a plurality of changes to a single file. Thus, if eight files are moved from one folder to another, the database file synchronization application may identify the change in attributes for each of the moved files. Additionally or alternatively, each change to a file may be a different database operation, such as changes to different columns.

The database file synchronization application may identify changes based on a difference between the original file and a new file. For example, the database file synchronization application may be programmed or configured to compare each field of a file with an earlier version of the file to determine which attributes have changed. Additionally or alternatively, the database file synchronization application may generate a write request which replaces all data for a particular item with the data from the changed file, regardless of which elements were changed.

At step 322, the database file synchronization application sends a write request to the database management system 120. For example, the database file synchronization application may send a request to make the identified changes to the data repository. The changes may comprise writing new values to one or more fields for a data item, removing one or more values from one or more fields of a data item, and/or changing one or more values in one or more fields for a data item. The database management system may then effectuate the one or more changes with respect to the data repository.

By using the file editors and/or file viewing interfaces as a vehicle for changing data, the database file synchronization application allows a file creator to use known tools for altering data in a data repository which the database file synchronization application is then able to translate into database operations. This allows users to make a large number of changes, such as appending a comment to a plurality of data items, without performing the individual changes at the database querying level.

Example Configuration Interface

In an embodiment, the configuration instructions are preset for the database file synchronization application. In other embodiments, defaults may be set in the configuration instructions. Additionally or alternatively, the database file synchronization application may provide options for creating configuration instructions for a particular deployment.

FIG. 4 depicts an example configuration interface. While FIG. 4 depicts two dialog boxes, folder format dialog 400 and file format dialog 410, the two dialog boxes are merely examples of interfaces that may be used to generate configuration instructions and any number of interfaces may be employed in varying manners to provide the configuration options.

Folder format dialog 400 comprises options for specifying a folder name 402, folder contents 404, and file attributes 406. The folder format dialog 400 may additionally include options for specifying a hierarchy for the folder, such as folders within the folder being created or one or more folder in which the folder is being created. Folder name 402 provides options for specifying a name of the folder that will be displayed in the VFS.

Folder contents 404 comprises one or more options for specifying the contents of a created folder. In FIG. 4, folder contents 404 comprises options for generating a query that will correspond to the created folder. As shown in FIG. 4, folder contents 404 comprises a first option for inputting an attribute type, a second option for selecting a relationship, and a third option for specifying a value. As a practical example, if "Status" is typed into the attribute type option and "Open" is typed into the value option, the created folder would be displayed with data that satisfies a query for files where "Status" equals "Open." As another example, folder contents 404 may be used to create a query which specifies that a "DateCreated" attribute has a value that is less than "01/01/19", thereby creating a folder that will be displayed with files created before Jan. 1, 2019.

In an embodiment, folder contents 404 may comprise options for generating multiple queries. For example, in response to a selection of the "+" option below folder contents 404, the interface may display a second query builder and an option to specify whether both queries must be satisfied (AND) or at least one query must be satisfied (OR). Thus, a "Past Due" folder may be created where the "Issue" attribute equals "Open" and the "DateCreated" attribute is less than "Jan. 1, 2019".

Where a folder is created with multiple attributes, changes to a file through the folder may be identified based on the type of change. For example, with the above query, deletion of the file could correspond to a change in the "DateCreated" attribute or a change in the "Status" attribute. The database file synchronization application may determine which attribute to change based on context. For example, if the file is moved to the "Closed" folder, the database file synchronization application may determine that "Status" attribute is to be changed and not the "DateCreated" attribute. Additionally, if the client computing device does not have permission to change one of the attributes, the database file synchronization application may change the other. As another example, if a file is placed into a folder requiring one of two queries to be satisfied and the file has data for one required attribute but not another, the database file synchronization application may generate data for the attribute lacking data instead of replacing existing data. If the database file synchronization application is unable to determine which attribute to change based on context, the database file synchronization application may display a dialog requesting input specifying which attribute to change and how.

File attributes 406 specify which attributes of the data are to be tracked for the folder. For instance, in FIG. 4, file attributes 406 currently include a "Date Created" attribute, a "Last Modified" attribute, and a "Status" attribute. Identifying tracked attributes allows the database file synchronization application to create a view of the VFS which includes the tracked attributes for visualization and/or sorting purposes. For example, a folder created through the folder format dialog 400 of FIG. 4 may include four columns—one for a file name, one for Date Created, one for Last Modified, and one for Status. If one of the columns is selected, the VFS may sort the displayed information by the tracked status. By providing options for selecting file attributes, the database file synchronization application provides additional sorting and viewing options when the data is retrieved.

File format dialog 412 comprises options for a file name 412, a file type 414, icon settings 416, and formatting tools 418. In an embodiment, the file format dialog 412 corresponds to a particular folder. For example, if a folder comprising particular rules is created through folder format dialog 400, the database file synchronization application may cause display of the file format dialog 412 for selecting file formats for the created folder. In an embodiment, the database file synchronization application populates fields of file format dialog 412 with one or more default options. Additionally or alternatively, the file format dialog 412 may comprise global options that correspond to each folder in the VFS unless one or more overrides are created.

File name 412 comprises options for specifying naming conventions for files in a folder and/or the VFS. File name 412 may be configured to accept input identifying one or more attributes, one or more rules, and/or one or more particular values. For example, the input in file name 412 of FIG. 4 includes two attributes, AttributeB and DateCreated separated by an underscore. Thus, files created according to the naming convention input into file name 412 of FIG. 4 would be named using the two identified attributes, such as "Mb-1503_03-25-19". A rule may also be specified, such as one that increments a value based on a number of files with a same name and/or based on a value for the file. For example, a file name 412 may be set as "'Action_Due'_[DateCreated+3/0/0]" which would increment the DateCreated value by 3 months.

File type 414 comprises one or more rules for specifying a format for the generated files in the folder. Thus, in FIG. 4, files created according to file type 414 would be created as ".txt" files and thus could be opened with any text editing application. In an embodiment, the file type rule may be generated for files within a particular folder, all files in the VFS, and/or for files that satisfy one or more rules. Thus, a rule may specify that files from one portion of the data repository be created as ".png" files while files from a different portion of the data repository be created as ".txt" files. In an embodiment, file format dialog 410 comprises options for specifying a default program for opening the files, such as a specific text editor.

Icon settings 416 comprise one or more rules for specifying images to use as icons for one or more files. Images may comprise one or more images stored in memory of the client computing device identified through a link to the stored image. For example, "Image135.jpg" may have been identified through a link to a location in memory in which the image is stored. The one or more rules may be general/default rules, such as a rule to use a particular image for the icon of all files unless another rule specifies others.

Additionally or alternatively, icon settings 416 may provide options for generating a rule which specifies an icon to use based on one or more attributes of a file. For example, in file format dialog 410, the icon settings 416 comprise an option for specifying an image, an attribute type, a relationship, and a value. Thus, icon settings 416 allows for generation of a rule that specifies a particular image to use as an icon if a particular attribute has a particular value. As an example, an image of a bug may be selected for files in which the Issue Type equals Bug. As another example, a yellow notification image may be selected as an icon for files have a DateCreated value that is three months less than a current date while a red notification image may be selected as an icon for files that have a DateCreated value that is five months less than a current date. In an embodiment, priorities may be specified such that the red notification rule is given higher priority than the yellow notification rule.

Formatting tools 418 comprise one or more rules for formatting a particular file. Formatting tools 418 may be used to specify how to display data within a particular file. For example, the drop-down menu of formatting tools 418 may specify one or more locations for an attribute in the file, such as a title, body, header, or footer. The attribute option specifies one or more values and/or attributes. For example, in FIG. 4 the attribute option includes text of "Tickets for" followed by an identifier of an attribute. Thus, the title of each file following this rule would include the words "Tickets for" followed by the value of the attribute for the file. Additionally formatting rules may also be set, such as text color, text size, and/or text formatting (not shown). The plus option may be used to generate additional formatting rules for additional values of the file.

While file format dialog 410 shows the use of fillable and/or drop-down bars for formatting files, different embodiments may use different interfaces. For example, a text editor formatter may be used to create formatting rules wherein identified attributes are formatted as displayed. For example, through a text editor formatter a user may identify an attribute, place the attribute in the file, identify text size and other text configuration options such as italics or bolding, and determine where the attribute is to appear in the file. Thus, if AttributeA is typed into the header of the text editor formatter and is given a red color and bolding, then the file may be configured to include the value for AttributeA in the header, bolded, and with a red color.

Example Virtual File System

Figure 5:
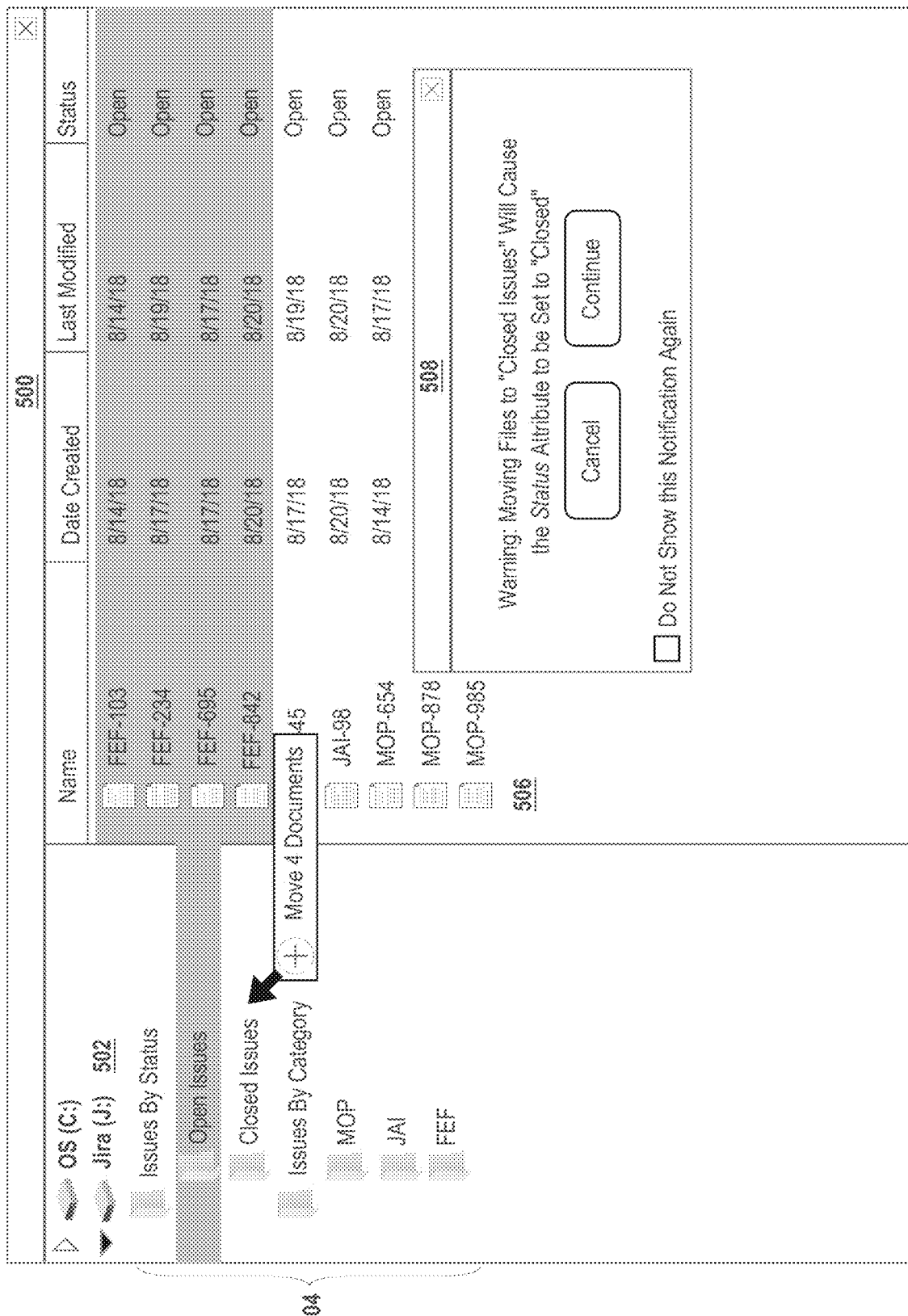
FIG. 5 depicts an example view of a virtual file system through a file viewer interface.

The systems and methods described herein allow a client computing system to treat data retrieved from an external database as part of a file system of the client computing device, thereby allowing the client computing device to display the virtual file system in the same interface as the file system generated from files stored in memory and use the tools of the file viewer to affect changes to the files in the virtual file system. FIG. 5 depicts an example view of a virtual file system through a file viewer interface.

Interface 500 comprises a file viewer interface for viewing files stored in memory of the client computing device. For example, interface 500 includes an identifier of a client computing device memory drive, the (C:) drive as well as the VFS drive 502. Thus, a user can switch between viewing files stored on memory of the computing device to viewing files generated from an external data repository in the same file viewer interface by selecting the VFS drive 502. In an embodiment, the file viewer interface includes a selectable drop-down option which, when selected for the VFS drive, 502 causes display of one or more folders of the VFS.

Folders 504 comprise folders of the VFS with a folder hierarchy dictated by the configuration information. For example, folders 504 comprise a folder entitled "Issues By Status" which includes two folders, "Open Issues" and "Closed Issues", each of which may include files generated from the external data based on the stored configuration information. Individual folders may include overlapping files. For example, the files in the "Issues By Category" folders may be repeated in either the "Open Issues" or "Closed Issues" folders depending on a status value for the files.

File viewer 506 depicts a view of individual files within a folder of the VFS. In file viewer 506, tracked attributes comprise a file name, date created, last modified, and status of the files. The files may additionally be ordered in the display based on one of the attributes. For example, in FIG. 5, the "file name" attribute has been selected so the files are displayed in alphabetic order based on file name. In an embodiment, the file viewer 506 may include more or less attributes than those specified to be tracked in the configuration information. For example, the file viewer may be configured to accept input specifying which attributes of a plurality of tracked attributes to display. Thus, a subset of the tracked attributes may be displayed.

In an embodiment, files displayed through the VFS may be manipulated through the tools of the file viewer of the operating system. The system may be programmed or configured to interpret actions using the tools of the file viewer to create changes in the external data repository. For example, in FIG. 5, four files have been selected through the file viewer and dragged to the "Closed Issues" folder using the tools of the file viewer, thereby causing the system to determine a change in the "Status" attribute of the files from "Open" to "Closed". In an embodiment, the system causes display of dialog 508 which warns that the movement of the files will cause the change in status.

In an embodiment, the system interprets movement of the files based on a folder to which they are being moved. For example, in FIG. 5, the four files are moved between two mutually exclusive folders given that each folder has a different requirement for the "Status" attribute. Thus, the system may interpret that the movement should cause the "Status" attribute to change, thereby removing the files from the "Open Issues" folder to the "Closed Issues" folder. If those same four files were moved to the MOP folder, the system may determine that the "Category" attribute is being changed from "FEF" to "MOP". Thus, while the files would appear in the MOP folder instead of the FEF folder, the files would also still appear in the "Open Issues" folder from where they were moved. Additionally or alternatively, if the files are moved to memory of the client computing system, the system may not change any values in the file, but copy the files to the memory location.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
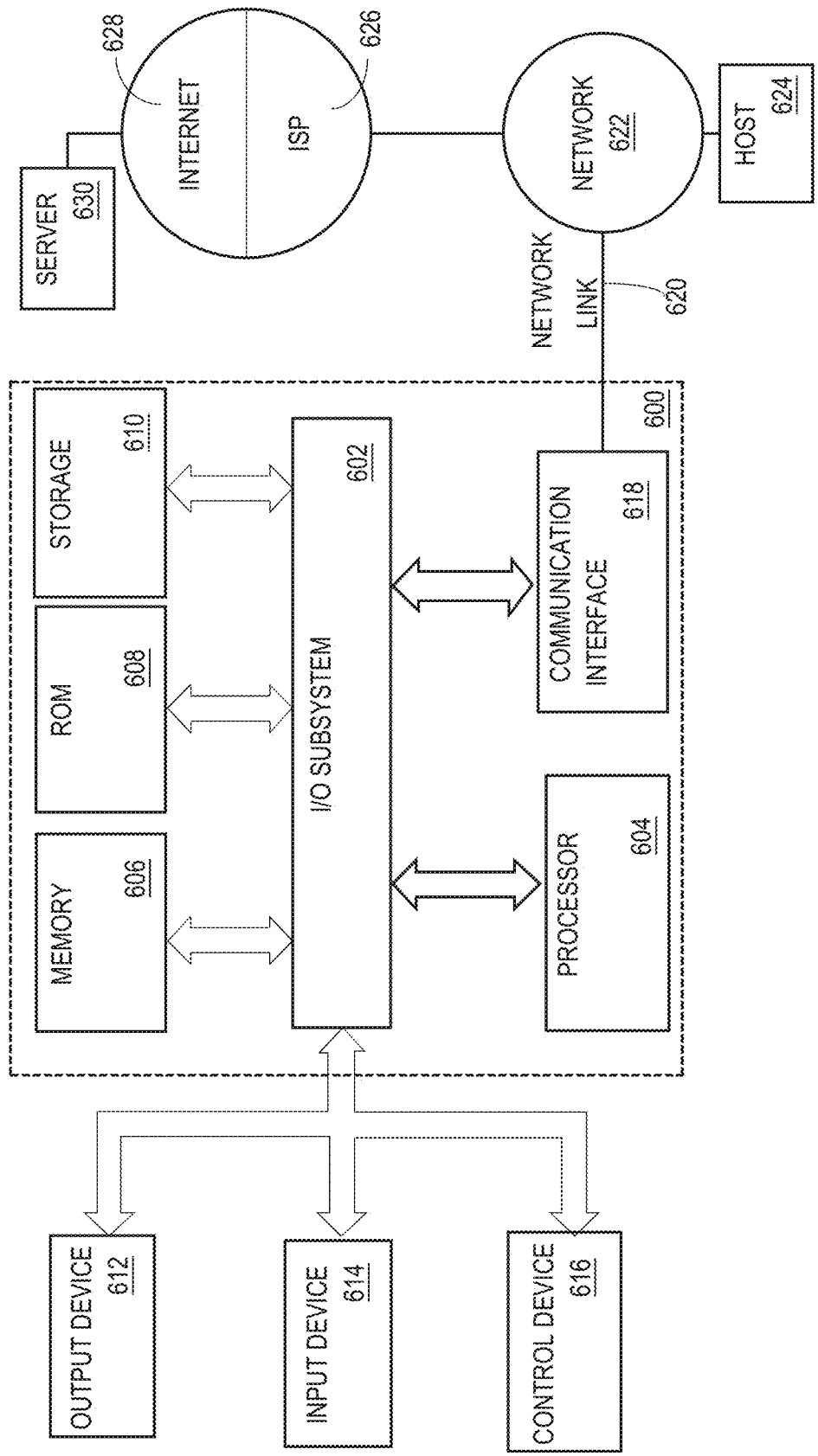
FIG. 6 is a block diagram that illustrates a computer system upon which an embodiment may be implemented.

For example, FIG. 6 is a block diagram that illustrates a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of implementing a virtual file system, the method comprising:
   receiving, from a client device, a request to display a set of items of the virtual file system within a file viewer interface;
   in response to the request, identifying one or more queries that correspond to the set of items;
   obtaining, from an issue tracking system, data that satisfies the one or more queries;
   receiving structured data corresponding to a hierarchical structure of the data obtained from the issue tracking system;
   causing display of, within the file viewer interface of the client device, the set of items using the structured data, the display of the set of items corresponding to the virtual file system;
   receiving, at the client device, an action to update a status of more than one item of the set of items; and
   causing a change in the issue tracking system corresponding to the updated status of the more than one item.

2. The method of claim 1, further comprising:
   receiving modification data identifying one or more changes to a particular item of the virtual file system; and
   transmitting a write request to the issue tracking system to cause replacement of the structured data with an updated structured data based on the one or more changes.

3. The method of claim 2, wherein the one or more changes to the particular item comprises movement from a first folder displayed within the virtual file system to a second folder displayed within the virtual file system.

4. The method of claim 2, wherein the one or more changes to the particular item comprises changing a value of a particular attribute of the particular item.

5. The method of claim 1, further comprising:
   receiving a second request to access the data from the issue tracking system; and
   accessing stored configuration information which defines one or more rules for configuring items in the virtual file system.

6. A method of presenting a virtual file system, the method comprising:
   causing display of, on a client device, a file viewer interface including a client memory drive corresponding to first data stored within a memory of the client device and a virtual file system drive corresponding to second data stored within a support ticket system;
   requesting structured data corresponding to a hierarchical structure of the second data from the support ticket system;
   in response to requesting the structured data, receiving the structured data and using the structured data to cause display of, within the file viewer interface, a set of items corresponding to the second data;

receiving, at the client device, an action to update a status of more than one item of the set of items; and causing a change in the support ticket system by modifying a portion of the second data that corresponds to the more than one item, thereby updating the status of the portion of the second data.

7. The method of claim 6, further comprising:

receiving, through the file viewer interface, a selection of a particular item of the set of items displayed within the file viewer interface of the client device;

using the selection, requesting information pertaining to the particular item from the support ticket system; and causing display of, on the client device, the information pertaining to the particular item.

8. The method of claim 6, wherein:

updating the status of the more than one item comprises changing a status indicator of the more than one item from a first status to a second status; and the more than one item is moved from a first folder corresponding to the first status to a second folder corresponding to the second status within the file viewer interface.

9. The method of claim 8, wherein:

the first status indicates that the more than one item is an open issue; and the second status indicates that the more than one item is a closed issue.

10. The method of claim 6, further comprising displaying, on the client device, a dialog which indicates that the action to update the status of the more than one item will cause the change in the support ticket system.

11. The method of claim 6, wherein the support ticket system is an issue tracking system.

12. The method of claim 6, further comprising:

assessing stored configuration information which identifies an image for a particular attribute of the more than one item; and causing display of, within the file viewer interface, the image as an icon for the more than one item.

13. A method for implementing a virtual file system on a client device, the method comprising:

causing display of a file viewer interface including a virtual file system drive corresponding to data within an issue tracking system;

requesting structured data corresponding to a hierarchical structure of the data;

receiving the structured data and using the structured data to display a file structure within the file viewer interface;

receiving, via the file structure, an interaction with at least one item of the file structure;

requesting, from the issue tracking system, information corresponding to the at least one item; and causing display of the information corresponding to the at least one item on the client device.

14. The method of claim 13, the method further comprising:

receiving a modification request to modify an attribute of the at least one item;

modifying the attribute of the at least one item using the file viewer interface; and causing a change in the at least one item within the issue tracking system.

15. The method of claim 14, wherein the attribute of the at least one item is at least one of a title of the at least one item, a category of the at least one item, or a numerical indicator of the at least one item.

16. The method of claim 14, further comprising, in response to receiving the modification request, causing display of a dialog that indicates that modifying the attribute will cause the change in the issue tracking system.

17. The method of claim 14, wherein causing the change in the at least one item comprises changing a status of the data within the issue tracking system.

18. The method of claim 13, the method further comprising:

receiving a request to create an additional item in the file structure of the file viewer interface;

receiving input for the additional item; and transmitting the request to create the additional item and the input for the additional item to the issue tracking system, thereby causing an issue corresponding to the additional item to be created within the issue tracking system.

19. The method of claim 18, further comprising receiving an updated file structure, the updated file structure including a location of the issue within the issue tracking system.

20. The method of claim 13, wherein the file viewer interface further includes a client memory drive corresponding to a number of files stored on a memory of the client device.

* * * * *